United States Patent
Puttagunta et al.

(10) Patent No.: US 12,536,199 B2
(45) Date of Patent: Jan. 27, 2026

(54) SMART PERSISTENCE OF MODEL FOR EFFECTIVE PREDICTIONS AND UPDATES

(71) Applicant: ServiceNow, Inc., Santa Clara, CA (US)

(72) Inventors: Sriram Puttagunta, Hyderabad (IN); Jishnu Sethumadhavan Nair, Hyderabad (IN); Bidyapati Pradhan, Hyderabad (IN); Nirali Dineshbhai Popat, Hyderabad (IN); Sravan Ramachandran, Hyderabad (IN); Vipul Mittal, Hyderabad (IN); Seganrasan Subramanian, Hyderabad (IN); Ranga Prasad Chenna, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 121 days.

(21) Appl. No.: 18/626,139

(22) Filed: Apr. 3, 2024

(65) Prior Publication Data
US 2025/0315447 A1    Oct. 9, 2025

(51) Int. Cl.
*G06F 16/00*    (2019.01)
*G06F 16/28*    (2019.01)

(52) U.S. Cl.
CPC ................... *G06F 16/285* (2019.01)

(58) Field of Classification Search
CPC ....................................... G06F 16/285
USPC ........................................... 707/737
See application file for complete search history.

(56) References Cited

U.S. PATENT DOCUMENTS

| | | | |
|---|---|---|---|
| 11,727,250 B2* | 8/2023 | Moraitis | G06F 16/285 706/18 |
| 2023/0078312 A1* | 3/2023 | Meron | G06F 16/951 707/737 |
| 2023/0385382 A1* | 11/2023 | Jain | G06F 18/23 707/707 |

* cited by examiner

*Primary Examiner* — Alexandria Y Bromell
(74) *Attorney, Agent, or Firm* — Fletcher Yoder, P.C.

(57) ABSTRACT

Systems and methods to identify a data cluster for an input data record based on a spatial distance to a representative subset of data records corresponding to the data cluster. The representative subset of data records may be identified based on a spatial distance to other records in the cluster.

18 Claims, 7 Drawing Sheets

SMART PERSISTENCE OF MODEL FOR EFFECTIVE PREDICTIONS AND UPDATES

TECHNICAL FIELD

The present disclosure relates to grouping records in a database, and in particular intelligently clustering similar records together for improved training and update time with minimal information loss.

BACKGROUND

A clustering algorithm can be used to identify and group related records in a database (also called clustering or sorting). For example, records that are stored in a database are converted to vector data and are then grouped using the clustering algorithm, which, in turn, identifies and groups related records based on the vector data. As new records are added, the clusters need to be updated. In order to update clusters, a subset of the records within a cluster are randomly selected to represent the entire cluster after every update. However, because the subsets of records are randomly selected, newly added records may be improperly identified as being dissimilar to proper clusters or similar to improper clusters, resulting in poorly classified or redundant clusters.

SUMMARY

One aspect of the disclosure includes a method for sorting or grouping records in a database. The method may include obtaining a plurality of data clusters, wherein each of the plurality of data clusters includes a corresponding set of datapoints. The method may further include identifying, within each of the plurality of data clusters, a respective subset of datapoints comprising a threshold amount of information corresponding to a total amount of information of the respective data cluster. The method may further include identifying a particular data cluster of the plurality of data clusters according to a determination that a respective subset of datapoints, of the particular data cluster, satisfies a similarity criterion with respect to unclassified data. The method may further include associating the unclassified data with the particular data cluster.

Implementations of the disclosure may include one or more of the following features. The method may include first and second data clusters, wherein the first data cluster includes a first set of datapoints, wherein the second data cluster includes a second set of datapoints, wherein identifying the respective subset of datapoints within each of the plurality of clusters includes identifying a first respective subset of datapoints of the first data cluster by selecting a first plurality of datapoints of the first data cluster such that the first plurality of datapoints comprises a first threshold amount of information corresponding to a first total amount of information of the first data cluster, and identifying a second respective subset of datapoints of the second data cluster by selecting a second plurality of datapoints of the second data cluster such that the second plurality of datapoints comprises a second threshold amount of information corresponding to a second total amount of information of the first data cluster. The method may indicate that the similarity criterion is identified based, at least in part on, an approximate nearest neighbor (ANN) algorithm indicating a spatial distance between the unclassified data and the respective subset of datapoints. The method may further indicate that obtaining the plurality of data clusters further includes performing a Density-Based Spatial Clustering of Applications with Noise (DBSCAN) algorithm to associate one or more datapoints to each of the plurality of data clusters. The method may further include updating the respective subset of datapoints of the particular data cluster after the unclassified data is associated with the particular data cluster. The method may additionally indicate the similarity criterion is satisfied when one or more datapoints of the respective subset of datapoints exists within spatial distance radius of the unclassified data. The method may further include associating the unclassified data with a new data cluster based on the determination that the respective subset of datapoints of the particular data cluster does not satisfy a similarity criterion.

Another aspect of the disclosure includes a system comprising one or more processors and a memory including computer-executable instructions. The one or more processors, when executing the computer-executable instructions, may cause the system to obtain a plurality of data clusters, wherein each of the plurality of data clusters includes a corresponding set of datapoints. The one or more processors may further cause the system to identify, within each of the plurality of data clusters, a respective subset of datapoints comprising a threshold amount of information corresponding to a total amount of information of the respective data cluster. The one or more processors may further cause the system to identify a particular data cluster of the plurality of data clusters according to a determination that a respective subset of datapoints, of the particular data cluster, satisfies a similarity criterion with respect to unclassified data. The one or more processors may further cause the system to associate the unclassified data with the particular data cluster.

Implementations of the disclosure may include one or more of the following features. The one or more processors may further cause the system to include first and second data clusters, wherein the first data cluster includes a first set of datapoints, wherein the second data cluster includes a second set of datapoints, wherein identifying the respective subset of datapoints within each of the plurality of clusters includes identifying a first respective subset of datapoints of the first data cluster by selecting a first plurality of datapoints of the first data cluster such that the first plurality of datapoints comprises a first threshold amount of information corresponding to a first total amount of information of the first data cluster, and identifying a second respective subset of datapoints of the second data cluster by selecting a second plurality of datapoints of the second data cluster such that the second plurality of datapoints comprises a second threshold amount of information corresponding to a second total amount of information of the first data cluster. The one or more processors may further cause the system to identify the similarity criterion based, at least in part on, an exact nearest neighbor algorithm indicating a spatial distance between the unclassified data and the respective subset of datapoints. The one or more processors may further cause the system to obtain the plurality of data clusters further includes performing a Density-Based Spatial Clustering of Applications with Noise (DBSCAN) algorithm to associate one or more datapoints to each of the plurality of data clusters. The one or more processors may further cause the system to update the respective subset of datapoints of the particular data cluster after the unclassified data is associated with the particular data cluster. The one or more processors may further cause the system to indicate the similarity criterion is satisfied when one or more datapoints of the respective subset of datapoints exists within spatial distance radius of the unclassified data. The one or more processors may further cause the system to associate the unclassified data with a new data cluster based on the determination that the respective subset of datapoints of the particular data cluster does not satisfy a similarity criterion. The system may further be a data center and the plurality of data clusters are associated with records stored on a database in a server in the data center.

Another aspect of the disclosure includes a non-transitory computer-readable storage medium having stored thereon executable instructions that are executable by one or more processors of a computer system. The computer-readable storage medium may include instructions to obtain a plurality of data clusters, wherein each of the plurality of data clusters includes a corresponding set of datapoints. The computer-readable storage medium may further include instructions to identify, within each of the plurality of data clusters, a respective subset of datapoints comprising a threshold amount of information corresponding to a total amount of information of the respective data cluster. The computer-readable storage medium may further include instructions to identify a particular data cluster of the plurality of data clusters according to a determination that a respective subset of datapoints, of the particular data cluster, satisfies a similarity criterion with respect to unclassified data. The computer-readable storage medium may further include instructions to associate the unclassified data with the particular data cluster.

Implementations of the disclosure may additionally include one or more of the following features. The computer-readable storage medium may further include instructions that cause the computer system to indicate that vectorizing the query includes dividing, using a sentencer, the query into a plurality of portions and vectorizing, using the second machine learning model, each portion of the plurality of portions. The computer-readable storage medium may further include instructions that cause the computer system to, for each artifact of the set of artifacts, reduce a dimensionality of the artifact. The computer-readable storage medium may further include instructions that cause the computer system to indicate the second machine learning model of a second platform is Java-based. The computer-readable storage medium may further include instructions that cause the computer system to indicate that vectorizing the respective record into a respective artifact further comprises performing a GUSE algorithm on the respective record. The computer-readable storage medium may further include instructions that cause the computer system to identify additional matching artifacts, wherein the additional matching artifacts comprise second highest similarity scores and return, in response to the query, the additional matching artifacts.

Implementations of the disclosure may additionally include one or more of the following features. The computer-readable storage medium may further include instructions to include first and second data clusters, wherein the first data cluster includes a first set of datapoints, wherein the second data cluster includes a second set of datapoints, wherein identifying the respective subset of datapoints within each of the plurality of clusters includes identifying a first respective subset of datapoints of the first data cluster by selecting a first plurality of datapoints of the first data cluster such that the first plurality of datapoints comprises a first threshold amount of information corresponding to a first total amount of information of the first data cluster, and identifying a second respective subset of datapoints of the second data cluster by selecting a second plurality of datapoints of the second data cluster such that the second plurality of datapoints comprises a second threshold amount of information corresponding to a second total amount of information of the first data cluster. The computer-readable storage medium may further include instructions to identify the similarity criterion based, at least in part on, an approximate nearest neighbor algorithm indicating a spatial distance between the unclassified data and the respective subset of datapoints. The computer-readable storage medium may further include instructions to update the respective subset of datapoints of the particular data cluster after the unclassified data is associated with the particular data cluster. The computer-readable storage medium may further include instructions to indicate the similarity criterion is satisfied when one or more datapoints of the respective subset of datapoints exists within spatial distance radius of the unclassified data. The computer-readable storage medium may further include instructions to associate the unclassified data with a new data cluster based on the determination that the respective subset of datapoints of the particular data cluster does not satisfy a similarity criterion.

BRIEF DESCRIPTION OF THE DRAWINGS

Various embodiments in accordance with the present disclosure will be described with reference to the drawings, in which.

DETAILED DESCRIPTION

Figure 1:
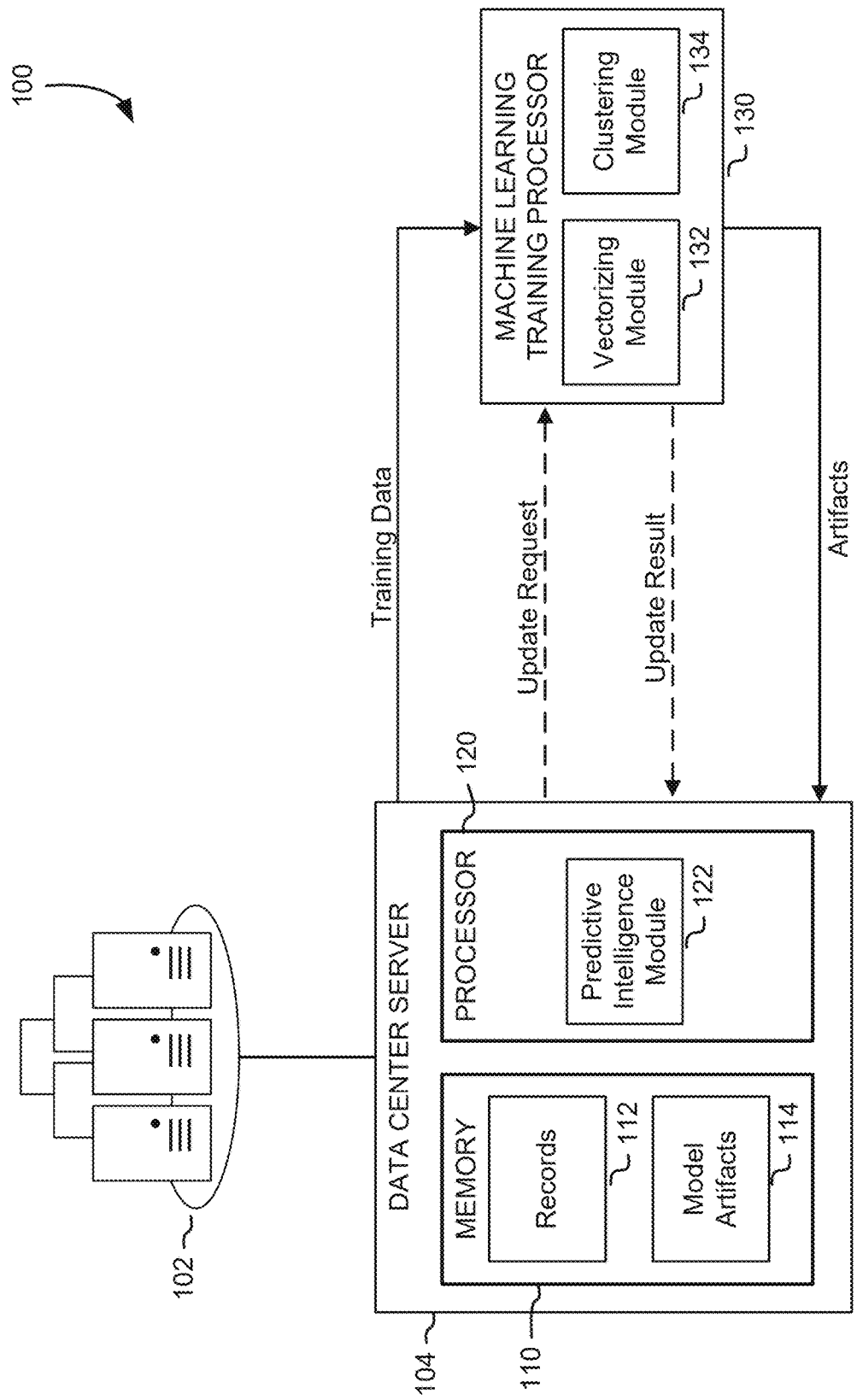
FIG. 1 illustrates a record grouping system, according to at least one embodiment.

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described.

In database management, it can be advantageous to cluster records together based on similarity. Clustering can be performed by a clustering algorithm configured to vectorize and sort or group records in the database. While these clusters are useful, in large databases it can be expensive or time consuming to parse through entire clusters. To help manage these clusters or updates to these clusters, current techniques include randomly selecting a subset of records from each cluster to represent the respective cluster. However, as the subset is random (and generally much smaller than the cluster), the subset may not accurately represent the cluster, which can lead to information loss. For example, a new record might not be added to the correct cluster of the subset does not accurately reflect that the new record is similar to the cluster. This may result in inefficiency, as it is faster and easier to add new records to existing clusters compared to creating new clusters.

Various implementations disclosed herein includes systems and methods to identify a data cluster for an input data record based on a spatial distance to a representative subset of data records corresponding to the data cluster. In at least one embodiment, the representative subset of data records may be identified based on a spatial distance to other records in the cluster. The representative subset of data records may include the data records of the cluster that most comprehensively represent data identified in the cluster and the subset of data records may include so called "dense data points," which are records that are connected to the greatest number of data points in the cluster. In at least one embodiment, dense data points are added to the representative subset of records until the cluster is sufficiently represented.

When a clustering algorithm is first implemented and trained, vectorized data records (also referred to as "vector artifacts" or "datapoints") may be grouped into clusters based on spatial distance. In at least one embodiment, when a data record has a close spatial distance to another data record, the records are considered similar/related, and are clustered together. In at least one embodiment, a representative subset of records is selected for each cluster by identifying the records that are closest to the greatest number of other records in the cluster (e.g., the dense data points). For example, a spatial distance is a Euclidean distance to another record as determined by an approximate nearest neighbor (ANN) algorithm.

In an embodiment, when new records are added, they are vectorized and their spatial distances are compared to the representative subsets of records (also referred to as "subsets of artifacts"). If the new record is similar to a representative subset of records of a particular cluster, then the new record may be added to the particular cluster. In at least one embodiment, if a new record is not similar to any representative records, a new cluster is created. Because the records in the representative subset of records are specifically chosen based on the distance similarity to other records in the cluster, clustering can be more accurate as redundant clusters are minimized.

By implementing the systems and methods disclosed herein, a model for performing database record searching can improve training time by approximately 70%. Information loss during persistence (e.g., clustering information saved for future comparison) can be reduced from approximately 90% to 20%. And no redundant clusters are formed due to the intelligent clustering algorithm. By implementing the systems and methods disclosed herein, a reduced training and update time also reduces memory constraints, minimizing chance for memory overflow and out-of-memory exceptions.

FIG. 1 illustrates a record grouping system 100, according to at least one embodiment. In at least one embodiment, system 100 comprises one or more processors 120 and one or more memories 110 in one or more data center servers 104 of a data center 102. System 100 may also comprise one or more machine learning (ML) training processors 130 communicating with processor 120 and memory 110 of data center server 104. In at least one embodiment, ML training processor 130 is remotely located from data center server 104 (e.g., within another server of data center 102 or in another system outside of data center 102) and communicates with processor 120 and memory 110 over a network. In another embodiment, ML training processor 130 is circuitry within data center server 104. In at least one embodiment, system 100 performs a record grouping process comprising obtaining a plurality of data clusters, wherein each of the plurality of data clusters includes a corresponding set of datapoints; identifying, within each of the plurality of data clusters, a respective subset of datapoints comprising a threshold amount of information corresponding to a total amount of information of the respective data cluster; identifying a particular data cluster of the plurality of data clusters according to a determination that a respective subset of datapoints, of the particular data cluster, satisfies a similarity criterion with respect to unclassified data; and associating the unclassified data with the particular data cluster.

In at least one embodiment, system 100 receives and stores various database records 112 in memory 110 of data center server 104. Database records 112 may, for example, comprise text records (e.g., knowledgebase articles, company information, customer information, etc.), image records (e.g., medical images, surveillance images, quality control images, etc.), video records (e.g., surveillance videos, news footage, etc.), audio records (e.g., meeting recordings, music recordings, etc.), and/or any other type of data record. In at least one embodiment, database records 112 stored in memory 110 are all of a same data type (e.g., containing only text records or only audio records). Database records 112 may include a combination of different data types but may also include a tag or marker that is used for grouping.

In at least one embodiment, data center server 104 includes a processor 120 with an predictive intelligence module 122. In at least one embodiment, processor 120 comprises a processing unit, such as a graphics processing unit (GPU), general-purpose GPU (GPGPU), parallel processing unit (PPU), central processing unit (CPU)), a data processing unit (DPU), a part of a system on chip (SoC), or combination thereof. In at least one embodiment, predictive intelligence module 122 is a machine learning model or a neural network that uses predictive intelligence to compare a vectorized artifact of an input record to model artifacts 114 to identify a similarity between an input record and other records of the database.

In at least one embodiment, the machine learning model of predictive intelligence module 122 is trained using an ML training processor 130. In at least one embodiment, ML training processor 130 comprises a processing unit, such as a graphics processing unit (GPU), general-purpose GPU (GPGPU), parallel processing unit (PPU), central processing unit (CPU)), a data processing unit (DPU), a part of a system on chip (SoC), or combination thereof.

In at least one embodiment, at first training, training data is transferred from processor 120 of data center server 104 to ML training processor 130. ML training processor 130 may then receive and convert each training record of the training data to a vector artifact using vectorizing module 132. In at least one embodiment, the training data includes part or all of records 112. In at least one embodiment, ML training processor 130 uses vectorizing module 132 to convert text records to vectors using term frequency-inverse document frequency (TF-IDF) algorithm. After a part, or all, of the training data has been converted to vector artifacts, ML training processor 130 groups the vector artifacts into clusters using clustering module 134, where artifacts "similar" or "related" to each other are grouped into a same cluster.

In at least one embodiment, clustering module 134 uses a Density-Based Spatial Clustering of Applications with Noise (DBSCAN) algorithm to perform clustering of vector artifacts. Clustering module 134 may identify, using DBSCAN, whether vector artifacts are similar to one another according to a similarity criterion and then places artifacts within a same cluster when similarity is identified. In at least one embodiment, this similarity criterion comprises a spatial distance (e.g., Euclidean distance) between vector artifacts, where any vector artifacts within a certain threshold distance from each other indicate that their corresponding records are similar. In at least one embodiment, if a vector artifact does not meet any similarity criterion (e.g., if the spatial distance is not within a threshold distance to any other vector artifact), then a new cluster is created containing the vector artifact.

In at least one embodiment, after all vector artifacts (and their corresponding database records) have been clustered and grouped, ML training processor 130 identifies a subset of artifacts for each cluster to represent the entire cluster using clustering module 134. In at least one embodiment, this subset comprises representative artifacts, which are identified according to a density criterion compared to other artifacts within the cluster (e.g., which artifact has the greatest number of other artifacts within a spatial distance threshold). In at least one embodiment, a representative artifact is identified if no other artifacts satisfy the similarity criterion (e.g., if no other vector artifacts exist within a spatial distance threshold). In at least one embodiment, a similarity criterion for identifying whether a given vector artifact should be a representative artifact of the subset of artifacts for the cluster is less than or equal to the similarity criterion for identifying whether a record is assigned to a cluster. Once all subsets of artifacts have been identified, ML training processor 130 transmits and stores the artifacts as model artifacts 114.

In at least one embodiment, model artifacts 114 persist in order to be used for updated training or additional classification. In at least one embodiment, processor 120 determines that model artifacts 114 requires updated information and a machine learning model of predictive intelligence module 122 requires updated training. In at least one embodiment, this determination occurs after a preset amount of time has elapsed or a preset system automation has triggered. In an embodiment, this determination occurs after a new record (or a threshold number of new records) have been added to records 112. In another embodiment, this determination occurs as a result of a manual request for update by a user.

In at least one embodiment, when an update is required, processor 120 transmits an update request along with model artifacts 114 and/or new records to ML training processor 130. ML training processor 130 may then assign the new records to clusters or create new clusters as appropriate based on a similarity to model artifacts 114 and then identifies a subset of artifacts for each cluster, using the same methods as previously described. In at least one embodiment, the subset of artifacts are re-identified for every cluster with every update. In at least one embodiment, the subset of artifacts are only re-identified for any cluster that has been updated with a new record. When the new subsets of artifacts are identified, ML training processor 130 transmits updated the subsets of artifacts to data center server 104 to be stored as updated model artifacts 114.

In at least one embodiment, performing some or all of the processes of system 100 enables a reduction in information loss during clustering from approximately 90% to 20% because a subset of artifacts is intelligently chosen specifically based on its density or spatial distance to other artifacts in the cluster, instead of randomly chosen. Performing some or all of the processes of system 100 may additionally enable faster updates when new records are added because redundant clusters would no longer be created.

In an embodiment, some or all of the processes of system 100 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process of system 100 may be performed by any suitable system, such as the computing device 700 of FIG. 7.

Figure 2:
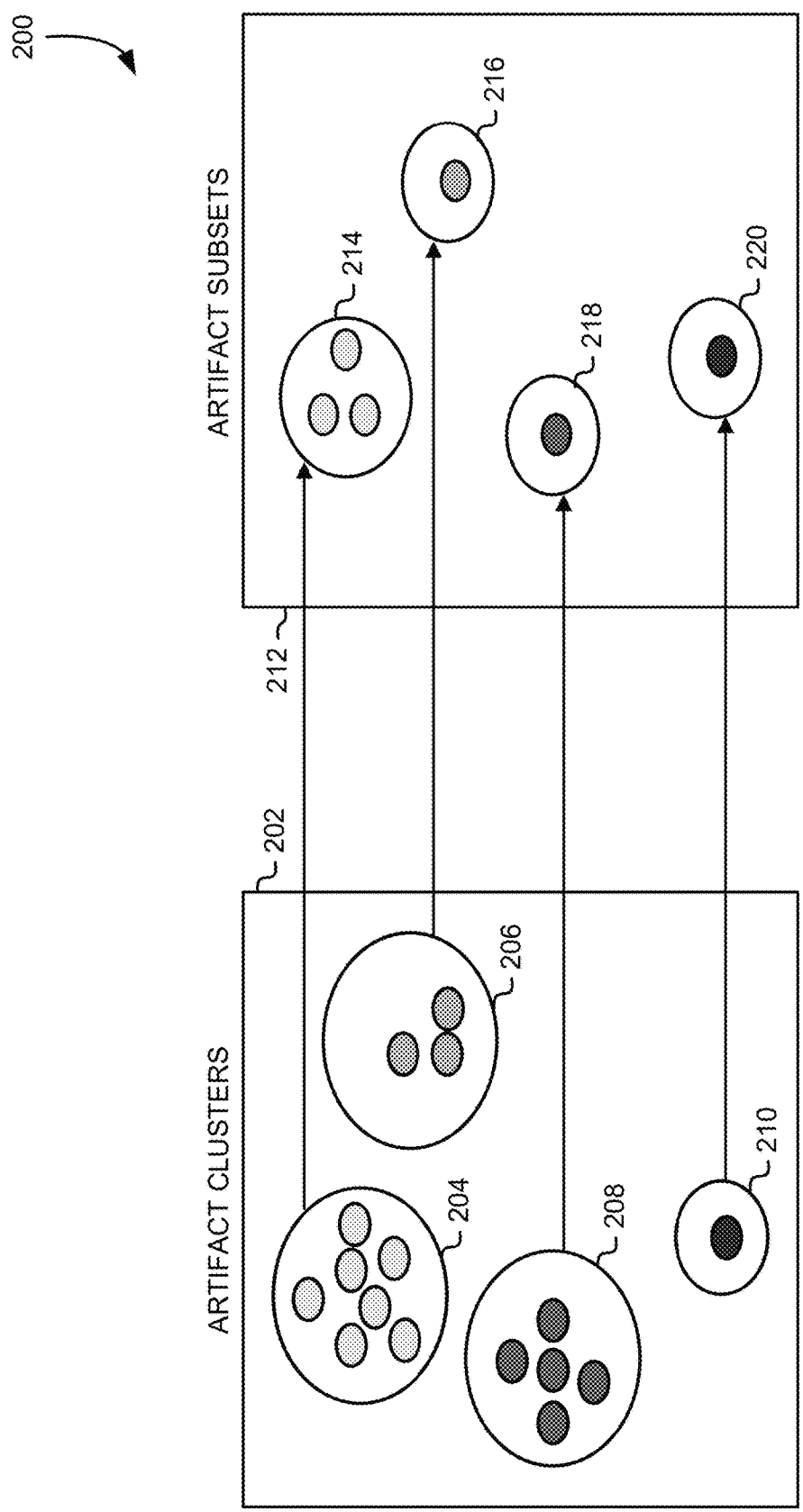
FIG. 2 illustrates a visualization of a data clustering process of a record grouping system, according to at least one embodiment.

FIG. 2 illustrates a visualization of a data clustering process 200, according to at least one embodiment. In at least one embodiment, process 200 can be performed by the system in FIG. 1 (e.g., record grouping system 100) to group records in a database.

In at least one embodiment, artifact clusters 202 comprises a group of clusters 204, 206, 208, and 210. Each cluster of artifact clusters 202 comprises various vector artifacts (shown as shaded ovals in FIG. 2). The size and grouping of clusters 204, 206, 208, and 210 may be defined according to a similarity criterion between vector artifacts within the respective clusters (as previously discussed with respect to FIG. 1.)

In at least one embodiment, a subset of artifacts 212 are identified (e.g., using processors 120 or 130 of FIG. 1) from among the vector artifacts of each of the clusters. Subsets of artifacts 214, 216, 218, and 220 directly correspond to clusters 204, 206, 208, and 210, respectively. An amount of artifacts in a subset used to represent a given cluster is determined based on the amount of artifacts that are within a spatial distance threshold to other artifacts within the cluster or based on an threshold of information corresponding to a total amount of information relative to the cluster. This way, when clusters are tightly clustered together, a few artifacts or a single artifact may be sufficient to represent the entire cluster. For example, clusters 206, 208, and 210 each represent an example cluster in which there is a single centralized artifact that is close in distance to all other artifacts within the cluster. Thus each of clusters 206, 208, and 210 only has one artifact in subsets 216, 218, and 220, respectively. Conversely, cluster 204 illustrates an example cluster in which no single artifact is close in distance to every other artifact. In this example, cluster 204 requires more than one artifact in subset 214 in order to meet the spatial distance threshold for the artifacts within the cluster (further explained with reference to FIG. 3.)

While the number of artifacts shown in FIG. 2 (and other figures of this disclosure) illustrates less than 10 artifacts per cluster, many more artifacts and many more clusters are within the scope of this disclosure (e.g., millions of different records grouped into thousands of different clusters based on a similarity criterion.)

In an embodiment, some or all of process 200 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 200 may be performed by any suitable system, such as the computing device 700 of FIG. 7.

Figure 3:
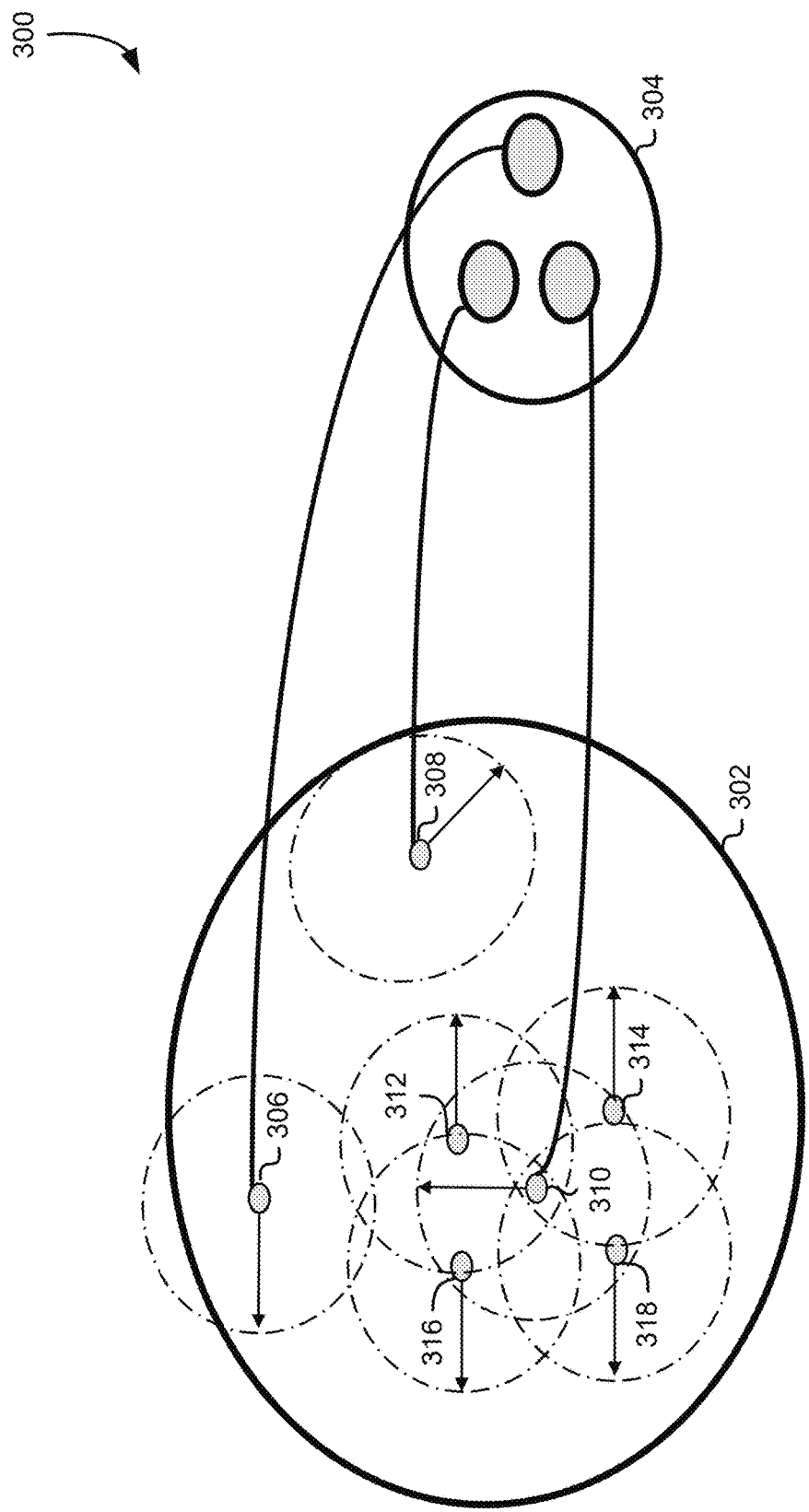
FIG. 3 illustrates a visualization of an artifact subset selection process of a record grouping system, according to at least one embodiment.

FIG. 3 illustrates a visualization of an artifact subset selection process 300, according to at least one embodiment. In at least one embodiment, process 300 can be performed by the system in FIG. 1 (e.g., record grouping system 100) to group records in a database.

In at least one embodiment, cluster 302 contains vector artifacts 306, 308, 310, 312, 314, 316, and 318. In at least one embodiment, an approximate nearest neighbor (ANN) algorithm (performed, for example, by processors 120 or 130) is used to identify a spatial distance radius around each of vector artifacts 306, 308, 310, 312, 314, 316, and 318. The ANN algorithm used may be, for example, a Hierarchical Navigable Small World ANN (HNSW ANN). Using HNSW ANN to identify this spatial distance radius is useful when there is a large amount of records to be analyzed (e.g., greater than 5000 records), as it can reduce training time of the machine learning model by approximately 70%.

In another embodiment, an exact nearest neighbor algorithm (performed, for example, by processors 120 or 130) is used to identify a spatial distance between vector artifacts 306, 308, 310, 312, 314, 316, and 318 when a total data size of vector artifacts in a set is less than a threshold (e.g., less than 5000 records).

In at least one embodiment, each of vector artifacts 306, 308, 310, 312, 314, 316, and 318 have a spatial distance radius identified by a dotted line as identified through a nearest neighbor algorithm (e.g., HNSW ANN). For example, artifacts 310, 312, 314, 316, and 318 each have at least one other artifact within their respective radii, which indicates that artifacts 310, 312, 314, 316, and 318 are determined to be within a spatial distance threshold. Conversely, artifacts 306 and 308 do not have any other vector artifact within their radii and are thus outside of a spatial distance threshold to any other datapoint. Then, a DBSCAN algorithm is performed using artifacts 310, 312, 314, 316, and 318 to identify a core point or core points to represent the group. Because artifact 310 contains 4 other artifacts within its radius (whereas artifacts 312, 314, 316, and 318 each contain only either 2 or 1 other artifact within its radius), a DBSCAN would identify artifact 310 as a core point that is within a threshold spatial distance to other points in the cluster.

In at least one embodiment, the number of artifacts in a subset are identified for a given cluster based on a threshold amount of information corresponding to a total amount of information for the cluster. In at least one embodiment, this threshold amount of information is approximately 80% (or approximately 20% information loss.) In at least one embodiment, this threshold amount of information is 95+% (or less than 5% information loss.)

In an embodiment, in order to determine whether a cluster has maintained a threshold amount of information, dense datapoints are identified (e.g., vector artifacts that are within a spatial distance radius to a large number of other neighboring artifacts). In order to find which vector artifacts have the greatest density, the vector artifacts may be grouped in descending order according to the number of other vector artifacts are within its radius, and the datapoints may be selected in descending order as being part of the cluster's subset of artifacts until the predetermined threshold amount of information is reached.

In the example of FIG. 3 with an information threshold of 95%, artifact 310 is identified as one of its cluster's subset of artifacts 304 because it was previously identified as being a dense datapoint that represents 5 out of the 7 artifacts in the cluster (itself plus the 4 artifacts within its spatial distance radius), which equates to approximately 71% information of the whole cluster. Then, artifact 306 is additionally chosen for subset 304, which increases the cluster information amount to approximately 86%. Lastly, artifact 308 is additionally chosen for subset 304, increasing the cluster information amount to near 100% because all 7 artifacts are represented. At this point, the 95% threshold is met.

The process 300 enables a significant reduction in information loss compared to other techniques (e.g., random selection of artifact subsets). Further, the process 300 enables a significant reduction in model training time compared to other techniques as a result of using an ANN algorithm to identify spatial distance similarity.

In an embodiment, the process 300 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 300 may be performed by any suitable system, such as the computing device 700 of FIG. 7. In at least one embodiment, performing process 200 of FIG. 2 and by performing process 300, efficient sorting and clustering of database records with smarter data persistence can be achieved.

Figure 4:
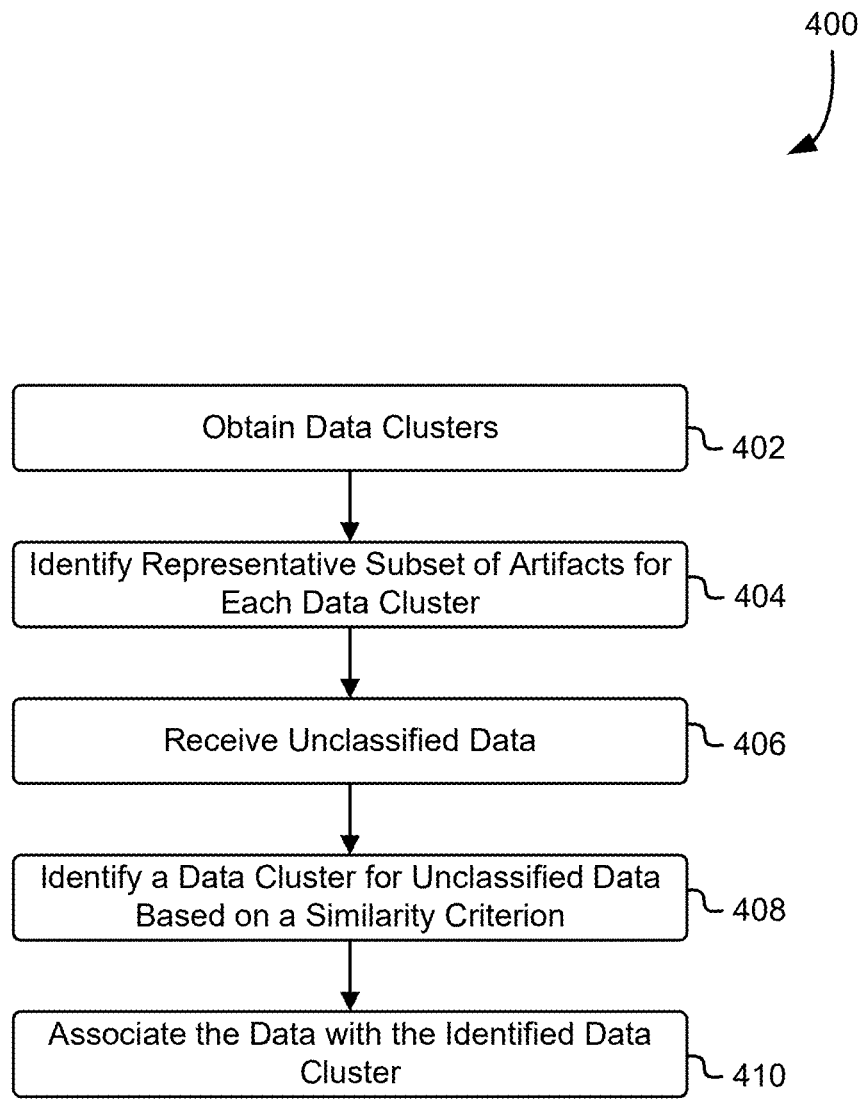
FIG. 4 illustrates a record grouping process, according to at least one embodiment.

FIG. 4 illustrates a record grouping process 400, according to at least one embodiment. In at least one embodiment, a system such as the system described in FIG. 1 (e.g., record grouping system 100 of FIG. 1) performs process 400 to group and cluster records in a database. In at least one embodiment, process 400 receives unclassified data and identifies an appropriate data cluster related to the unclassified data.

In at least one embodiment, at step 402, a system (e.g., system 100 of FIG. 1) uses a processor (e.g., processor 120 or 130 of FIG. 1) to identify and group records of a database (e.g., records 112 of FIG. 1) into data clusters (e.g., artifact clusters 202 of FIG. 2) based on vectorized representations of the records. In at least one embodiment, records grouped together in a cluster indicate that the records are similar in context or content. In at least one embodiment, database records are converted to vector artifacts and the artifacts are then clustered according to a similarity criterion (e.g., spatial distance).

In at least one embodiment, at step 404, the processor to identifies, for each data cluster, one or more subsets of artifacts (e.g., subsets of artifacts 212 of FIG. 2) to represent its respective cluster and to persist for future clustering operations. In at least one embodiment, a subset of artifacts is identified based on a similarity criterion. In at least one embodiment, this similarity criterion is spatial distance as determined by an ANN algorithm (e.g., HNSW ANN). In at least one embodiment, a subset of artifacts is identified using a DBSCAN algorithm to identify one or more core vector artifacts of neighboring artifacts identified by an ANN algorithm. In at least one embodiment, these subset of artifacts are stored as model artifacts (e.g., model artifacts 114 of FIG. 1). In at least one embodiment, by identifying a subset of artifacts as described herein, a significant reduction in information loss compared to other techniques (e.g., random selection of subset of artifacts) can be achieved. In at least one embodiment, by using an ANN algorithm as described herein, a significant reduction in time to train the system's machine learning model can similarly be achieved.

In at least one embodiment, at step 406, the processor receives unclassified data (e.g., new database records) from a user or another source. In at least one embodiment, this unclassified data is converted to a vector artifact (e.g., using vectorizing module 132 of FIG. 1).

In at least one embodiment, at step 408, the processor identifies a data cluster for the unclassified data received at step 406 based on a similarity criterion. In at least one embodiment, a vector artifact of the unclassified data is compared to stored model artifacts (e.g., model artifacts 114 of FIG. 1) to determine an appropriate data cluster for the unclassified data. In at least one embodiment, by basing the similarity on intelligently selected artifacts representing the data clusters, more accurate comparisons and determinations can be made regarding similarity to other records in the cluster.

In at least one embodiment, at step 410, when the vector artifact of the unclassified data is within a spatial distance threshold to a stored model artifact (or a subset of artifacts) for a given cluster, the processor adds or assigns the unclassified data to that cluster at step 410. In at least one embodiment, when a vector artifact of the unclassified data is not within a spatial distance threshold to any stored model artifact, then the processor creates a new cluster for that unclassified data. In at least one embodiment, by using intelligently selected artifacts to represent the data clusters, new vector artifacts can be properly assigned to their corresponding data clusters, eliminating creation of redundant clusters.

In an embodiment, some or all of process 400 (or any other processes described such as process 200 of FIG. 2, process 300 of FIG. 3, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system, such as the computing device 700 of FIG. 7.

Figure 5:
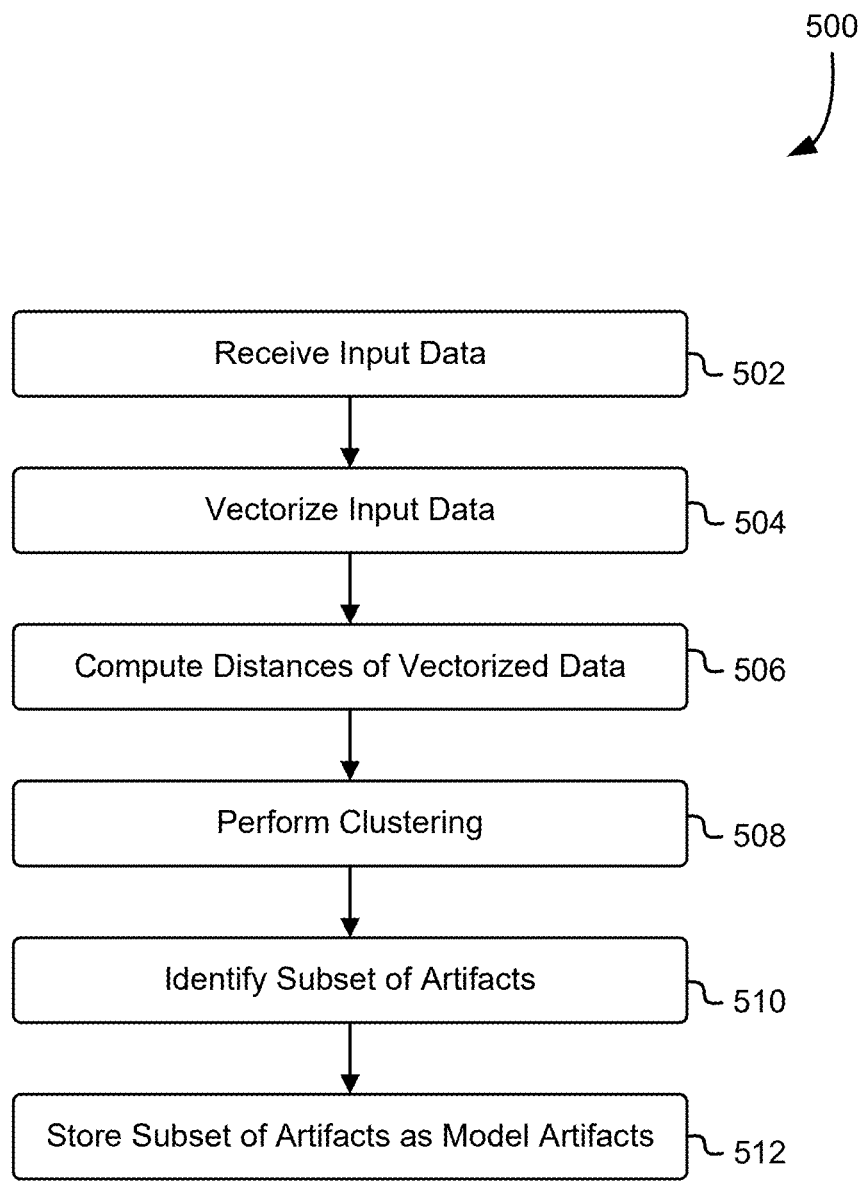
FIG. 5 illustrates a training process of a record grouping system, according to at least one embodiment.

FIG. 5 illustrates a training process 500 of a record grouping system (e.g., system 100 of FIG. 1), according to at least one embodiment. In at least one embodiment, a processor (e.g., processor 120 or 130 of FIG. 1) performs processes 500 to train a machine learning model to sort and/or cluster records in a database.

In at least one embodiment, at step 502, a processor (e.g., ML training processor 130 of FIG. 1) receives input data (e.g., records 112 of FIG. 1) from a database to be used for training a machine learning model. In at least one embodiment, at step 504, a processor vectorizes the input data (e.g., using vectorizing module 132) to convert the input data into vector artifacts.

In at least one embodiment, at step 506, a processor computes spatial distances between vector artifacts using a nearest neighbor algorithm (e.g., ANN) to identify whether the records corresponding to the vector artifacts are similar in context or content. In at least one embodiment, vector artifacts that have small spatial distances between them are considered strongly correlated or similar.

In at least one embodiment, at step 508, a processor performs clustering using an algorithm (e.g., DBSCAN) to group similar vector artifacts together (e.g., artifact clusters 202 of FIG. 2) according to a similarity criterion (e.g., spatial distance.)

In at least one embodiment, at step 510, a processor identifies a subset of artifacts to correspond to each of the clusters created or modified at step 508. In at least one embodiment, these subsets of artifacts are determined based on a similarity criterion (e.g., spatial distance) to one another and identified through an algorithm (e.g., ANN and/or DBSCAN) as previously described with reference to FIG. 3. In at least one embodiment, a number of artifacts in a subset chosen for a given cluster is based on a threshold amount of information. In at least one embodiment, at step 512, a processor stores the subsets of artifacts as model artifacts (e.g., model artifacts 114) to be used for future clustering operations.

In an embodiment, some or all of process 500 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 500 may be performed by any suitable system, such as the computing device 700 of FIG. 7.

Figure 6:
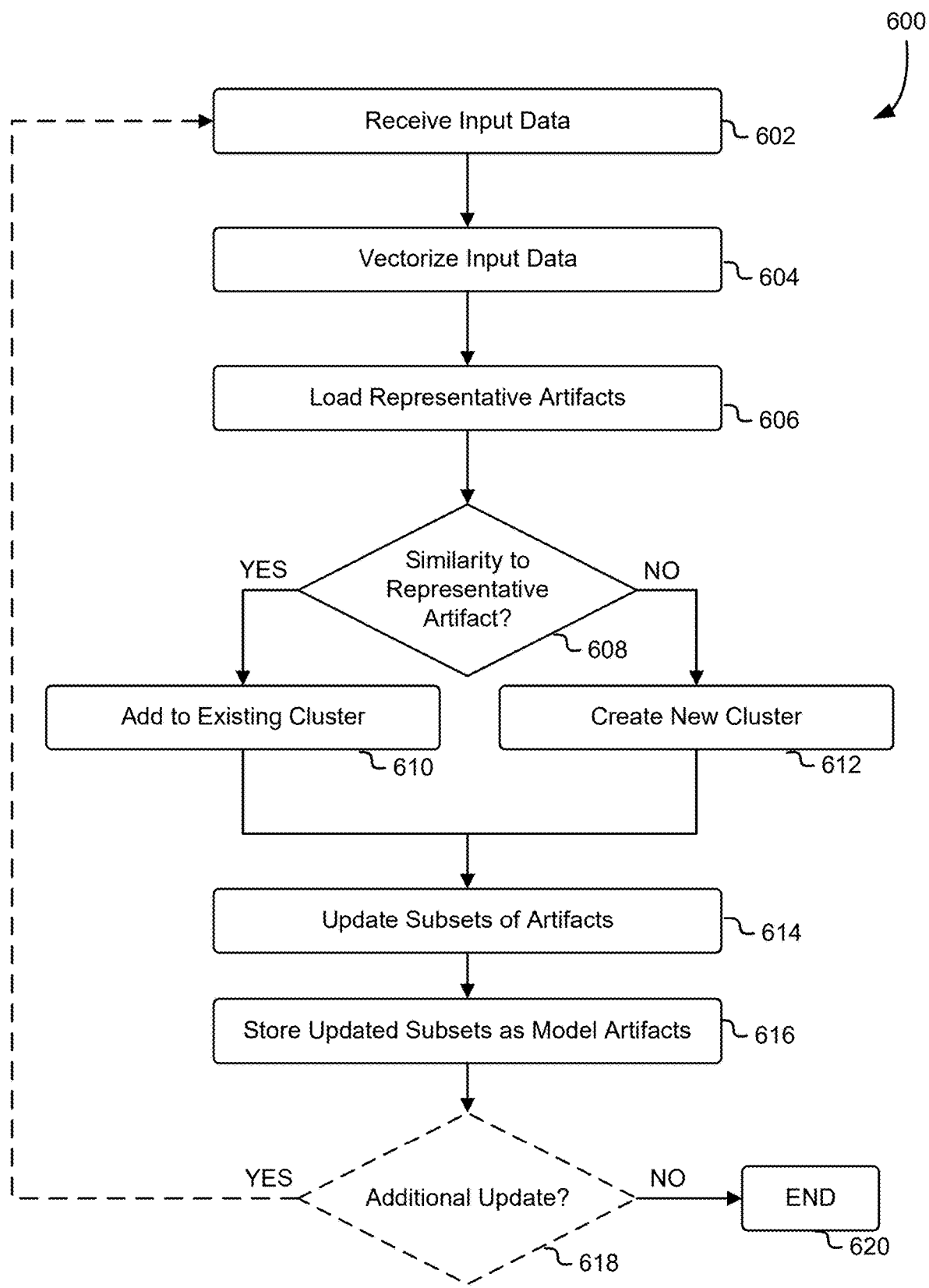
FIG. 6 illustrates an updating process of a record grouping system, according to at least one embodiment.

FIG. 6 illustrates an update process 600 of a record grouping system (e.g., system 100 of FIG. 1), according to at least one embodiment. In at least one embodiment, a processor (e.g., processor 120 or 130 of FIG. 1) performs processes 600 to update a machine learning model to sort and/or cluster new records in a database.

In at least one embodiment, at step 602, a processor (e.g., processor 120 or ML training processor 130 of FIG. 1) receives new input data stored in a database (e.g., a newly added record of records 112 of FIG. 1) to be used to update a machine learning model. In at least one embodiment, at step 604, a processor vectorizes the input data (e.g., using vectorizing module 132) to convert the input data into vector artifacts.

In at least one embodiment, at step 606, a processor loads the subsets of artifacts (e.g., model artifacts 114) that were previously stored to persist for future operations (e.g., at step 512 of FIG. 5). In at least one embodiment, a processor computes spatial distances between vector artifacts of the new input data and the subsets of artifacts using a nearest neighbor algorithm (e.g., ANN), which indicates the records are similar in context or content. In at least one embodiment, vector artifacts that have small spatial distances between them are considered strongly correlated or similar.

In at least one embodiment, at step 508, a processor determines whether if a vector artifact of the new input data is similar to a subset of artifacts based on the computation at step 606. In at least one embodiment, if a vector artifact is similar to a subset of artifacts of a given cluster (YES at step 608), then the processor adds that vector artifact and the corresponding record to the cluster at step 610. In at least one embodiment, if a vector artifact is not similar to a subset of artifacts (NO at step 608), then a new cluster is created for the artifact at step 612.

In at least one embodiment, at step 614, a processor updates the subsets of artifacts for all of the clusters or only for each of the clusters created or modified at steps 610 or 612. In at least one embodiment, these subsets of artifacts are determined based on a similarity criterion (e.g., spatial distance) to one another and identified through an algorithm (e.g., ANN and/or DBSCAN) as previously described with reference to FIG. 3. In at least one embodiment, a number of artifacts in a subset chosen for a given cluster is based on a tolerable information loss previously described with respect to FIG. 3. In at least one embodiment, at step 616, a processor stores the subsets of artifacts as model artifacts (e.g., model artifacts 114) to be used for future clustering operations.

In at least one embodiment, at step 618, a processor may optionally determine whether additional updates are required. In at least one embodiment, this determination occurs after a preset amount of time has elapsed or a preset system automation has triggered. In at least one embodiment, this determination occurs after a new record (or a threshold number of new records) have been added to records 112. In at least one embodiment, this determination occurs as a result of a manual request for update by a user. In at least one embodiment, when an additional update is to be performed (YES at step 618), process 600 repeats, beginning with step 602. In at least one embodiment, when no additional updates are needed (NO at step 618) or when no determination is made, process 600 ends at step 620.

In an embodiment, some or all of process 600 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as the computing device 700 of FIG. 7.

In at least one embodiment, performing processes 500 and 600, enables a significant reduction in information loss compared to other techniques (e.g., random selection of subsets of artifacts). In at least one embodiment, performing some or all of the process 300 enables a significant reduction in model training time compared to other techniques as a result of using an ANN algorithm to identify spatial distance similarity.

Figure 7:
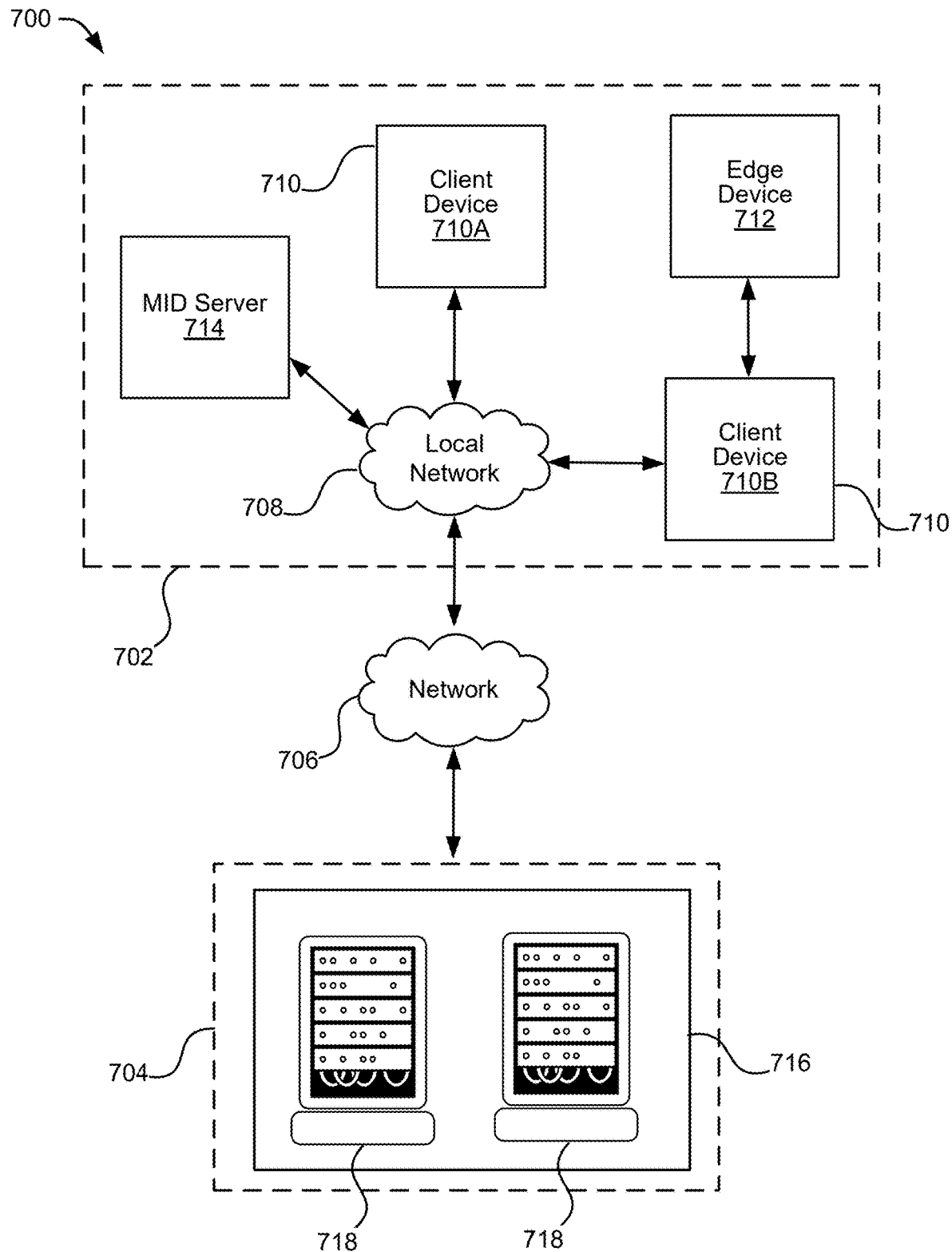
FIG. 7 illustrates a system in which various embodiments can be implemented.

FIG. 7 illustrates a system 700 in which various embodiments can be implemented. The system 700 may include a client network 702 and a provider platform 704 that are operably connected via a network 706 (e.g., the Internet). In an embodiment, the client network 702 may be a private local network 708, such as a local area network (LAN) that includes a variety of network devices that include, but are not limited to, switches, servers, and routers. In an embodiment, the client network 702 can comprise an enterprise network that can include one or more LANs, virtual networks, data centers, and/or other remote networks. In an embodiment, the client network 702 can be operably connected to one or more client devices 710 such as example client device 710A, 710B so that the client devices 710 are able to communicate with each other and/or with the provider platform 704. In an embodiment, the client devices 710 can be computing systems and/or other types of computing devices generally referred to as Internet of Things (IoT) devices that can access cloud computing services, for example, via a web browser application or via an edge device 712 that may act as a gateway between one or more client devices 710 and the platform 704 (e.g., second client device 710B). In an embodiment, the client network 702 can include a management, instrumentation, and discovery (MID) server 714 that facilitates communication of data between the network hosting the platform 704, other external applications, data sources, and services, and the client network 702. In an embodiment, the client network 702 may also include a connecting network device (e.g., a gateway or router) or a combination of devices that implement a customer firewall or intrusion protection system.

In an embodiment, the client network 702 can be operably coupled to the network 706, which may include one or more suitable computing networks, such a large area network (LAN), wide area networks (WAN), the Internet, and/or other remote networks, that are operable to transfer data between the client devices 710 and the provider platform 704. In an embodiment, one or more computing networks within network 706 can comprise wired and/or wireless programmable devices that operate in the electrical and/or optical domain. For example, network 706 may include wireless networks, such as cellular networks (e.g., Global System for Mobile Communications (GSM) based cellular network), WIN networks, and/or other suitable radio-based networks. The network 706 may also employ any suitable network communication protocols, such as Transmission Control Protocol (TCP), Internet Protocol (IP), and the like. In an embodiment, network 706 may include a variety of network devices, such as servers, routers, network switches, and/or other suitable network hardware devices configured to transport data over the network 706.

In an embodiment, the provider platform 704 may be a remote network (e.g., a cloud network) that is able to communicate with the client devices 710 via the client network 702 and network 706. In an embodiment, the provider platform 704 can comprise a configuration management database (CMDB) platform. In an embodiment, the provider platform 704 provides additional computing resources to the client devices 710 and/or the client network 702. For example, by utilizing the provider platform 704, in some examples, users of the client devices 710 can build and execute applications for various enterprise, IT, and/or other organization-related functions. In one embodiment, the provider platform 704 can be implemented on the one or more data centers 716, where each data center 716 can correspond to a different geographic location in some examples. In an embodiment, one or more the data centers 716 includes a plurality of servers 718 (also referred to in some examples as application nodes, virtual servers, application servers, virtual server instances, application instances, application server instances, or the like), where each server 718 can be implemented on a physical computing system, such as a single electronic computing device (e.g., a single physical hardware server) or across multiple-computing devices (e.g., multiple physical hardware servers). Examples of servers 718 can include a virtual server, a web server (e.g., a unitary Apache installation), an application server (e.g., a unitary Java Virtual Computer), and/or a database server.

To utilize computing resources within the provider platform 704, in an embodiment, network operators may choose to configure the data centers 716 using a variety of computing infrastructures. In an embodiment, one or more of the data centers 716 can be configured using a multi-instance cloud architecture to provide every customer with its own unique customer instance or instances. For example, a multi-instance cloud architecture of some embodiments can provide each customer instance with its own dedicated application server and dedicated database server. In some examples, the multi-instance cloud architecture could deploy a single physical or virtual server 718 and/or other combinations of physical and/or virtual servers 718, such as one or more dedicated web servers, one or more dedicated application servers, and one or more database servers, for each customer instance. In an embodiment of a multi-instance cloud architecture, multiple customer instances can be installed on one or more respective hardware servers, where each customer instance is allocated certain portions of the physical server resources, such as computing memory, storage, and processing power. By doing so, in some examples each customer instance has its own unique software stack that provides the benefit of data isolation, relatively less downtime for customers to access the platform 704, and customer-driven upgrade schedules.

In some embodiments, the provider platform 704 includes a computer-generated data management server that receives, via network 706 and/or an internal network within or across different data centers, computer-generated data for storage and analysis. For example, log entries can be sent from client devices/servers 710, MID server 714 (e.g., agent server acting as the intermediary in client network 702 to facilitate access to client network 702 by the network hosting the platform 704), and/or servers in data centers 716 to a log management server in data centers 716.

Although FIG. 7 illustrates a specific embodiment of a cloud computing system 700, the disclosure is not limited to the specific embodiments illustrated in FIG. 7. For instance, although FIG. 7 illustrates that the platform 704 is implemented using data centers, other embodiments of the platform 704 are not limited to data centers and can utilize other types of remote network infrastructures. Some embodiments may combine one or more different virtual servers into a single virtual server. The use and discussion of FIG. 7 are only examples to facilitate ease of description and explanation and are not intended to limit the disclosure to the specific examples illustrated therein. In an embodiment, the respective architectures and frameworks discussed with respect to FIG. 7 can incorporate suitable computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

One aspect of the disclosure includes a method for sorting or grouping records in a database. The method may include obtaining a plurality of data clusters, wherein each of the plurality of data clusters includes a corresponding set of datapoints. The method may further include identifying, within each of the plurality of data clusters, a respective subset of datapoints comprising a threshold amount of information corresponding to a total amount of information of the respective data cluster. The method may further include identifying a particular data cluster of the plurality of data clusters according to a determination that a respective subset of datapoints, of the particular data cluster, satisfies a similarity criterion with respect to unclassified data. The method may further include associating the unclassified data with the particular data cluster.

Implementations of the disclosure may include one or more of the following features. The method may include first and second data clusters, wherein the first data cluster includes a first set of datapoints, wherein the second data cluster includes a second set of datapoints, wherein identifying the respective subset of datapoints within each of the plurality of clusters includes identifying a first respective subset of datapoints of the first data cluster by selecting a first plurality of datapoints of the first data cluster such that the first plurality of datapoints comprises a first threshold amount of information corresponding to a first total amount of information of the first data cluster, and identifying a second respective subset of datapoints of the second data cluster by selecting a second plurality of datapoints of the second data cluster such that the second plurality of datapoints comprises a second threshold amount of information corresponding to a second total amount of information of the first data cluster. The method may indicate that the similarity criterion is identified based, at least in part on, an approximate nearest neighbor (ANN) algorithm indicating a spatial distance between the unclassified data and the respective subset of datapoints. The method may further indicate that obtaining the plurality of data clusters further includes performing a Density-Based Spatial Clustering of Applications with Noise (DBSCAN) algorithm to associate one or more datapoints to each of the plurality of data clusters. The method may further include updating the respective subset of datapoints of the particular data cluster after the unclassified data is associated with the particular data cluster. The method may additionally indicate the similarity criterion is satisfied when one or more datapoints of the respective subset of datapoints exists within spatial distance radius of the unclassified data. The method may further include associating the unclassified data with a new data cluster based on the determination that the respective subset of datapoints of the particular data cluster does not satisfy a similarity criterion.

Another aspect of the disclosure includes a system comprising one or more processors and a memory including computer-executable instructions. The one or more processors, when executing the computer-executable instructions, may cause the system to obtain a plurality of data clusters, wherein each of the plurality of data clusters includes a corresponding set of datapoints. The one or more processors may further cause the system to identify, within each of the plurality of data clusters, a respective subset of datapoints comprising a threshold amount of information corresponding to a total amount of information of the respective data cluster. The one or more processors may further cause the system to identify a particular data cluster of the plurality of data clusters according to a determination that a respective subset of datapoints, of the particular data cluster, satisfies a similarity criterion with respect to unclassified data. The one or more processors may further cause the system to associate the unclassified data with the particular data cluster.

Implementations of the disclosure may include one or more of the following features. The one or more processors may further cause the system to include first and second data clusters, wherein the first data cluster includes a first set of datapoints, wherein the second data cluster includes a second set of datapoints, wherein identifying the respective subset of datapoints within each of the plurality of clusters includes identifying a first respective subset of datapoints of the first data cluster by selecting a first plurality of datapoints of the first data cluster such that the first plurality of datapoints comprises a first threshold amount of information corresponding to a first total amount of information of the first data cluster, and identifying a second respective subset of datapoints of the second data cluster by selecting a second plurality of datapoints of the second data cluster such that the second plurality of datapoints comprises a second threshold amount of information corresponding to a second total amount of information of the first data cluster. The one or more processors may further cause the system to identify the similarity criterion based, at least in part on, an exact nearest neighbor algorithm indicating a spatial distance between the unclassified data and the respective subset of datapoints. The one or more processors may further cause the system to obtain the plurality of data clusters further includes performing a Density-Based Spatial Clustering of Applications with Noise (DBSCAN) algorithm to associate one or more datapoints to each of the plurality of data clusters. The one or more processors may further cause the system to update the respective subset of datapoints of the particular data cluster after the unclassified data is associated with the particular data cluster. The one or more processors may further cause the system to indicate the similarity criterion is satisfied when one or more datapoints of the respective subset of datapoints exists within spatial distance radius of the unclassified data. The one or more processors may further cause the system to associate the unclassified data with a new data cluster based on the determination that the respective subset of datapoints of the particular data cluster does not satisfy a similarity criterion. The system may further be a data center and the plurality of data clusters are associated with records stored on a database in a server in the data center.

Another aspect of the disclosure includes a non-transitory computer-readable storage medium having stored thereon executable instructions that are executable by one or more processors of a computer system. The computer-readable storage medium may include instructions to obtain a plurality of data clusters, wherein each of the plurality of data clusters includes a corresponding set of datapoints. The computer-readable storage medium may further include instructions to identify, within each of the plurality of data clusters, a respective subset of datapoints comprising a threshold amount of information corresponding to a total amount of information of the respective data cluster. The computer-readable storage medium may further include instructions to identify a particular data cluster of the plurality of data clusters according to a determination that a respective subset of datapoints, of the particular data cluster, satisfies a similarity criterion with respect to unclassified data. The computer-readable storage medium may further include instructions to associate the unclassified data with the particular data cluster.

Implementations of the disclosure may additionally include one or more of the following features. The computer-readable storage medium may further include instructions that cause the computer system to indicate that vectorizing the query includes dividing, using a sentencer, the query into a plurality of portions and vectorizing, using the second machine learning model, each portion of the plurality of portions. The computer-readable storage medium may further include instructions that cause the computer system to, for each artifact of the set of artifacts, reduce a dimensionality of the artifact. The computer-readable storage medium may further include instructions that cause the computer system to indicate the second machine learning model of a second platform is Java-based. The computer-readable storage medium may further include instructions that cause the computer system to indicate that vectorizing the respective record into a respective artifact further comprises performing a GUSE algorithm on the respective record. The computer-readable storage medium may further include instructions that cause the computer system to identify additional matching artifacts, wherein the additional matching artifacts comprise second highest similarity scores and return, in response to the query, the additional matching artifacts.

Implementations of the disclosure may additionally include one or more of the following features. The computer-readable storage medium may further include instructions to include first and second data clusters, wherein the first data cluster includes a first set of datapoints, wherein the second data cluster includes a second set of datapoints, wherein identifying the respective subset of datapoints within each of the plurality of clusters includes identifying a first respective subset of datapoints of the first data cluster by selecting a first plurality of datapoints of the first data cluster such that the first plurality of datapoints comprises a first threshold amount of information corresponding to a first total amount of information of the first data cluster, and identifying a second respective subset of datapoints of the second data cluster by selecting a second plurality of datapoints of the second data cluster such that the second plurality of datapoints comprises a second threshold amount of information corresponding to a second total amount of information of the first data cluster. The computer-readable storage medium may further include instructions to identify the similarity criterion based, at least in part on, an approximate nearest neighbor algorithm indicating a spatial distance between the unclassified data and the respective subset of datapoints. The computer-readable storage medium may further include instructions to update the respective subset of datapoints of the particular data cluster after the unclassified data is associated with the particular data cluster. The computer-readable storage medium may further include instructions to indicate the similarity criterion is satisfied when one or more datapoints of the respective subset of datapoints exists within spatial distance radius of the unclassified data. The computer-readable storage medium may further include instructions to associate the unclassified data with a new data cluster based on the determination that the respective subset of datapoints of the particular data cluster does not satisfy a similarity criterion.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—For example, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A method, comprising:
   obtaining a plurality of data clusters, wherein each of the plurality of data clusters includes a corresponding set of datapoints, wherein obtaining the plurality of data clusters comprises associating one or more datapoints to each of the plurality of data clusters;
   identifying, within each of the plurality of data clusters, a respective subset of datapoints comprising a threshold amount of information corresponding to a total amount of information of the respective data cluster;
   identifying a particular data cluster of the plurality of data clusters according to a determination that a respective subset of datapoints, of the particular data cluster, satisfies a similarity criterion with respect to unclassified data, wherein the similarity criterion is satisfied when one or more datapoints of the respective subset of datapoints exists within spatial distance radius of the unclassified data; and associating the unclassified data with the particular data cluster.

2. The method of claim 1, wherein the plurality of data clusters includes first and second data clusters, wherein the first data cluster includes a first set of datapoints, wherein the second data cluster includes a second set of datapoints, wherein identifying the respective subset of datapoints within each of the plurality of clusters includes:

identifying a first respective subset of datapoints of the first data cluster by selecting a first plurality of datapoints of the first data cluster such that the first plurality of datapoints comprises a first threshold amount of information corresponding to a first total amount of information of the first data cluster; and identifying a second respective subset of datapoints of the second data cluster by selecting a second plurality of datapoints of the second data cluster such that the second plurality of datapoints comprises a second threshold amount of information corresponding to a second total amount of information of the first data cluster.

3. The method of claim 1, wherein the similarity criterion is identified based, at least in part on, an approximate nearest neighbor (ANN) algorithm indicating a spatial distance between the unclassified data and the respective subset of datapoints.

4. The method of claim 1, wherein obtaining the plurality of data clusters comprises associating one or more datapoints to each of the plurality of data clusters comprises: performing a Density-Based Spatial Clustering of Applications with Noise (DBSCAN) algorithm.

5. The method of claim 1, further comprising:
updating the respective subset of datapoints of the particular data cluster after the unclassified data is associated with the particular data cluster.

6. The method of claim 1, further comprising:
associating the unclassified data with a new data cluster based on the determination that the respective subset of datapoints of the particular data cluster does not satisfy a similarity criterion.

7. A system, comprising:
one or more processors; and
memory including computer-executable instructions that, if executed by the one or more processors, cause the system to:
obtain a plurality of data clusters, wherein each of the plurality of data clusters includes a corresponding set of datapoints, wherein obtaining the plurality of data clusters comprises associating one or more datapoints to each of the plurality of data clusters;
identify, within each of the plurality of data clusters, a respective subset of datapoints comprising a threshold amount of information corresponding to a total amount of information of the respective data cluster; and
identify a particular data cluster of the plurality of data clusters according to a determination that a respective subset of datapoints, of the particular data cluster, satisfies a similarity criterion with respect to unclassified data, wherein the similarity criterion is satisfied when one or more datapoints of the respective subset of datapoints exists within spatial distance radius of the unclassified data; and
associate the unclassified data with the particular data cluster.

8. The system of claim 7, wherein the plurality of data clusters includes first and second data clusters, wherein the first data cluster includes a first set of datapoints, wherein the second data cluster includes a second set of datapoints, wherein to identify the respective subset of datapoints within each of the plurality of clusters further includes:

identifying a first respective subset of datapoints of the first data cluster by selecting a first plurality of datapoints of the first data cluster such that the first plurality of datapoints comprises a first threshold amount of information corresponding to a first total amount of information of the first data cluster; and identifying a second respective subset of datapoints of the second data cluster by selecting a second plurality of datapoints of the second data cluster such that the second plurality of datapoints comprises a second threshold amount of information corresponding to a second total amount of information of the first data cluster.

9. The system of claim 7, wherein the similarity criterion is identified based, at least in part on, an exact nearest neighbor algorithm indicating a spatial distance between the unclassified data and the respective subset of datapoints.

10. The system of claim 7, wherein associating one or more datapoints to each of the plurality of data clusters comprises: performing a Density-Based Spatial Clustering of Applications with Noise (DBSCAN) algorithm.

11. The system of claim 7, wherein the one or more processors further cause the system to:
update the respective subset of datapoints of the particular data cluster after the unclassified data is associated with the particular data cluster.

12. The system of claim 7, wherein the one or more processors further cause the system to:
associating the unclassified data with a new data cluster when the determination that the respective subset of datapoints of the particular data cluster does not satisfy a similarity criterion.

13. The system of claim 7, wherein the system is a data center and the plurality of data clusters are associated with records stored on a database in a server in the data center.

14. A non-transitory computer-readable storage medium having stored thereon executable instructions which, when executed by one or more processors of a computer system, cause the computer system to:
obtain a plurality of data clusters, wherein each of the plurality of data clusters includes a corresponding set of datapoints, wherein obtaining the plurality of data clusters comprises associating one or more datapoints to each of the plurality of data clusters;
identify, within each of the plurality of data clusters, a respective subset of datapoints comprising a threshold amount of information corresponding to a total amount of information of the respective data cluster; and
identify a particular data cluster of the plurality of data clusters according to a determination that a respective subset of datapoints, of the particular data cluster, satisfies a similarity criterion with respect to unclassified data, wherein the similarity criterion is satisfied when one or more datapoints of the respective subset of datapoints exists within spatial distance radius of the unclassified data; and associate the unclassified data with the particular data cluster.

15. The non-transitory computer-readable storage medium of claim 14, wherein the plurality of data clusters includes first and second data clusters, wherein the first data cluster includes a first set of datapoints, wherein the second data cluster includes a second set of datapoints, wherein to identify the respective subset of datapoints within each of the plurality of clusters further includes:
 identifying a first respective subset of datapoints of the first data cluster by selecting a first plurality of datapoints of the first data cluster such that the first plurality of datapoints comprises a first threshold amount of information corresponding to a first total amount of information of the first data cluster; and
 identifying a second respective subset of datapoints of the second data cluster by selecting a second plurality of datapoints of the second data cluster such that the second plurality of datapoints comprises a second threshold amount of information corresponding to a second total amount of information of the first data cluster.

16. The non-transitory computer-readable storage medium of claim 14, wherein the similarity criterion is identified based, at least in part on, an approximate nearest neighbor (ANN) algorithm indicating a spatial distance between the unclassified data and the respective subset of datapoints.

17. The non-transitory computer-readable storage medium of claim 14, wherein the one or more processors further cause the computer system to:
 update the respective subset of datapoints of the particular data cluster after the unclassified data is associated with the particular data cluster.

18. The non-transitory computer-readable storage medium of claim 14, wherein the one or more processors further cause the computer system to:
 associate the unclassified data with a new data cluster based on the determination that the respective subset of datapoints of the particular data cluster does not satisfy a similarity criterion.

* * * * *